(12) United States Patent
Craik (10) Patent No.: US 11,409,580 B2
(45) Date of Patent: *Aug. 9, 2022

(54) MODIFYING A SERIES OF LOCK ACQUIRE AND RELEASE OPERATIONS TO USE A SINGLE LOCK RESERVATION

(71) Applicant: INTERNATIONAL BUSINESS MACHINES CORPORATION, Armonk, NY (US)

(72) Inventor: Andrew James Craik, North York (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 176 days.

This patent is subject to a terminal disclaimer.

(21) Appl. No.: 16/802,552

(22) Filed: Feb. 26, 2020

(65) Prior Publication Data

US 2021/0263787 A1  Aug. 26, 2021

(51) Int. Cl.
*G06F 9/52* (2006.01)
*G06F 9/38* (2018.01)
*G06F 9/48* (2006.01)
*G06F 8/41* (2018.01)

(52) U.S. Cl.
CPC .............. *G06F 9/526* (2013.01); *G06F 8/443* (2013.01); *G06F 9/3812* (2013.01); *G06F 9/3851* (2013.01); *G06F 9/4881* (2013.01)

(58) Field of Classification Search
CPC ........ G06F 9/526; G06F 8/443; G06F 9/3812; G06F 9/3851; G06F 9/4881
See application file for complete search history.

(56) References Cited

U.S. PATENT DOCUMENTS

| 7,451,438 | B2 | 11/2008 | Kielstra et al. | |
| 7,823,150 | B2 * | 10/2010 | Grcevski | G06F 9/526 718/1 |
| 9,578,130 | B1 * | 2/2017 | Nguyen | G06F 9/5088 |

(Continued)

OTHER PUBLICATIONS

Russell et al; Eliminating Synchronization-Related Atomic Operations with Biased Locking and Bulk Rebiasing; 9 pages (Year: 2006).*

(Continued)

*Primary Examiner* — Wei Y Zhen
*Assistant Examiner* — Brahim Bourzik
(74) *Attorney, Agent, or Firm* — Konrad Raynes Davda & Victor LLP; David W. Victor (57) ABSTRACT

Provided are a computer program product, system, and method for modifying a series of lock acquire and release operations to use a single lock reservation. A representation of source code is scanned to determine a series of acquire lock program statement and release lock program statement pairs to acquire and release a lock by a thread. A first acquire lock program statement in the series is modified to be an acquire with reserve program statement that when executed by the thread causes the thread to acquire the lock and indicate the lock as reserved for use by the thread. A last release lock program statement in the series is modified to be a release with cancel program statement that when executed by the thread causes the thread to release the lock and indicate the lock as not reserved.

17 Claims, 6 Drawing Sheets

(56) References Cited

U.S. PATENT DOCUMENTS

| | | | | |
|---|---|---|---|---|
| 2005/0289549 A1* | 12/2005 | Cierniak | ............... | G06F 9/526 |
| | | | | 718/102 |
| 2006/0015700 A1* | 1/2006 | Burka | ............... | G06F 9/526 |
| | | | | 711/163 |
| 2008/0250396 A1* | 10/2008 | Grcevski | ............... | G06F 8/443 |
| | | | | 717/124 |
| 2009/0064094 A1* | 3/2009 | Burka | ............... | G06F 9/30087 |
| | | | | 717/106 |
| 2009/0144281 A1* | 6/2009 | Grcevski | ............... | G06F 9/528 |

OTHER PUBLICATIONS

C. Haubl, et al., "Context sensitive trace inlining for Java", Computer Languages, Systesm & Structures, 2013, pp. 45, [online][Retrived Feb. 22, 2020], https://www.ncbi.nlm.nih.gov/pmc/articles/PMC4872537/?report=printable.

K. Kawachiya, "Java Locks: Analysis and Acceleration", Graduate School of Media and Governance at Keio University, Nov. 30, 2005, pp. 174.

K. Kawachiya, et al., "Lock Reservation: Java Locks Can Mostly Do Without Atomic Operations", OOPSLA'02, Nov. 4-8, 2002, Seattle, Washington, USA, ACM, 2002, pp. 12.

"Lock Reservation", Eclipse OpenJ9 Blog, Apr. 2, 2019, pp. 7, [online][Retrived Feb. 8, 2020], https://blog.openj9.org/2019/04/02/lock-reservation/.

F. Pizlo, et al., "Fine-grained Adaptive Biased Locking", PPPJ '11, Aug. 24-26, 2011, Kongens Lyngby, Denmark. ACM, 2011, pp. 11.

M. Stoodly, "Java Synchronization: Not as bad as it used to be!", IBM Corporation, 2004, pp. 27.

\* cited by examiner

| | TID | RC (5 bits) | Reserved | FLC | State |
|---|---|---|---|---|---|
| 302 | 0 | 0 | 0 | 0 | Unlocked |
| 304 | Set | 0 | 1 | 0 | Biased-Unlocked |
| 306 | Set | 1 | 1 | 0 | Biased-Locked |
| 308 | Set | >=2 | 1 | 0 | Biased-NestedLock |
| 310 | Set | 0 | 0 | 0 | Flat-Locked |
| 312 | Set | >=1 | 0 | 0 | Flat-NestedLock |

Lock State Table

MODIFYING A SERIES OF LOCK ACQUIRE AND RELEASE OPERATIONS TO USE A SINGLE LOCK RESERVATION

BACKGROUND OF THE INVENTION

1. Field of the Invention

The present invention relates to a computer program product, system, and method for modifying a series of lock acquire and release operations to use a single lock reservation.

2. Description of the Related Art

Locks are used to allow multiple threads or tasks concurrently executing in a computer system to coordinate their access to shared resources and implement mutual exclusion. Acquiring a lock to a resource is computationally expensive, requiring execution of special processor instructions to atomically set values in memory or to make writes visible to other processors (so-called fences). Efforts are continually made to optimize the acquisition of locks to make the process less computationally expensive. Some of these efforts involve compiler optimizations to eliminate redundant locks, which operate on a per unit of compilation basis and must be conservatively correct, and optimizing the performance of lock sequences themselves by making the sequences more efficient and minimizing the use of expensive processor operations.

One such lock optimization technique is lock reservation in which the system assumes that locks are normally only taken by a single thread. This pattern of single threaded locking often occurs in programs written in Java® where synchronized methods require mutual exclusion for the code in a method, but many of the classes using synchronized methods are only ever accessed on a single thread. (Java is a registered trademark of Oracle Corporation). Biased locking optimizes locking costs for a thread to repeatedly acquire a given lock, but at the cost of making it much more expensive for another thread to acquire the lock. The acquisition of a reserved lock by another thread is known as a reservation cancellation and generally requires the thread requesting the cancellation to block until the reserving thread has halted execution and unlocked the object. Lock reservation has been shown to improve performance in real-world programs. However, lock reservation is used sparingly because it involves a global lock state optimization, where objects participating in reservation can originate anywhere in the system and be performed based object type.

Described embodiments provide improved techniques for managing locks in situations where a same lock is continually acquired and released by a thread in a series of closely spaced operations.

SUMMARY

Provided are a computer program product, system, and method for modifying a series of lock acquire and release operations to use a single lock reservation. A representation of source code is scanned to determine a series of acquire lock program statement and release lock program statement pairs to acquire and release a lock by a thread. A first acquire lock program statement in the series of acquire lock program statements is modified to be an acquire with reserve program statement that when executed by the thread causes the thread to acquire the lock and indicate the lock as reserved for use by the thread. A last release lock program statement in the series of release lock program statements is modified to be a release with cancel program statement that when executed by the thread causes the thread to release the lock and indicate the lock as not reserved.

DETAILED DESCRIPTION

Execution of a series of lock acquire and release operations with respect to a single lock of a resource by the same thread is very computationally expensive. Described embodiments provide an optimization to a section of code having a series of lock acquire and release operations on the same lock by using a lock reservation over this local section of code having the repeated acquire and release operations. This reduces computational costs by surrounding a plurality of lock acquire and release operations with a lock reservation and one or more pre-emptive lock reservation cancellations. The lock reservation region created by this transformation significantly reduces the cost of lock acquisition and release operations in the region—the acquisition and release operations on the reserved lock do not need to use computationally expensive atomic or memory fence instructions. In an embodiment these acquisitions and releases of a reserved lock correspond to incrementing or decrementing a counter in the lock metadata used to determine whether a lock is currently held.

The described embodiments reduce the computational cost of these repeated locking sequences without risking program functional correctness, where an incorrect reservation results in a performance drop from a lock reservation potentially being cancelled rather than a functional bug which would result from traditional lock coarsening or elimination. Further, this local reservation can be done independently of whether the target lock participates in a global lock reservation scheme or not. The described embodiments are especially beneficial in systems where objects are regularly transferred between threads of execution but undergo repeated locking on one thread in the same area of code.

Described embodiments optimize a section of code having a series of lock acquire and release operations to a same lock by including a single lock reservation at the start/ahead of the section of code and a reservation cancellation at the end/after the section of code with the series of acquire and release operations. In further embodiments, pre-emptive reservation cancellation statements are inserted at exit points in the execution of the flow of the series of acquire and release operations where control flow departs the sequence of acquires and releases being optimized while the lock being optimized is not expected to be held. The pre-emptive release cancel statement converts a reserved lock state to an unreserved lock state. In the described embodiment this is done by converting a reserved, but not held, lock into a unreserved and not held lock by clearing a reservation bit if at the exit point.

Figure 1:
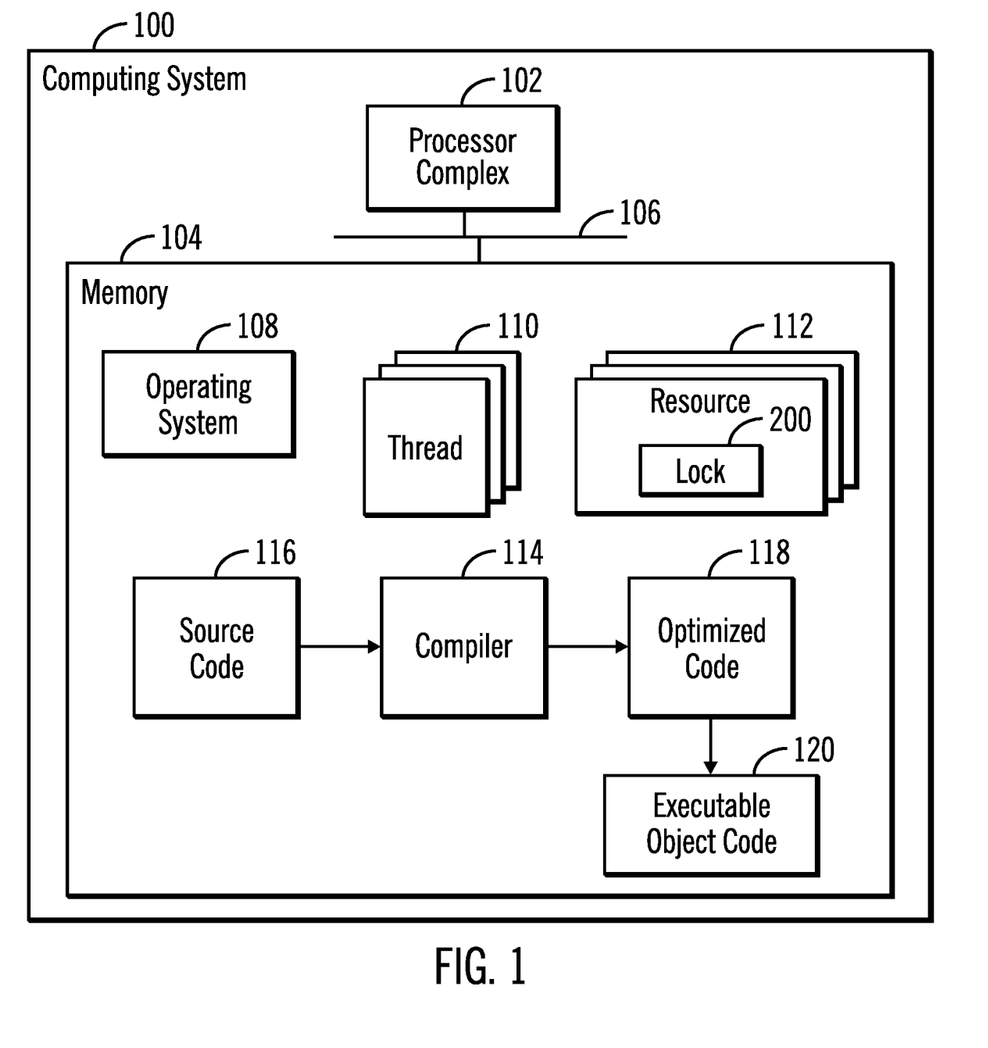
FIG. 1 illustrates an embodiment of a computing environment.

FIG. 1 illustrates an embodiment of a computing system 100 having a processor complex 102 that may access a memory 104 over a system bus 106. The memory 104 includes an operating system 108 that may spawn threads 110 that seek to access resources 112, which may be in the memory 104 (as shown) or in some other location, to perform thread operations. To obtain a resource 112, the thread 110 accessing the resource 112 must obtain a lock 200 for the resource 112, which may be stored within the resource 112 or with metadata for the resource 112, to serialize access to the resource 112. The resource 112 may comprise data objects, files in a file system implemented in the operating system 108, database objects, such as tables, rows, columns, tablespaces, etc., applications and functions, storage resources, memory resources, etc. In further embodiments, the resources 112 being serialized by the locks 200, within the resources 112, may represent internal devices to the computing system 100, such as adaptors, storage devices, etc., or external computing resources external to the computing system 100, such as machines, robots, external devices, external storage, etc.

The memory 104 may further include a compiler 114 to compile source code 116 implementing the threads 110 and resources 112 to produce optimized code 118 which may then be further compiled into executable object code 120. The compiler 114 may be implemented on a different computing system from the computer systems at which the executable object code 120 will be deployed to execute the threads 110 and locks 200 to the resources 112 as described herein.

Figure 2:
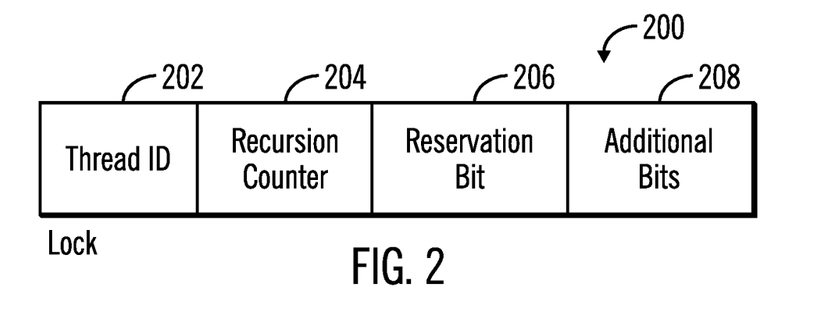
FIG. 2 illustrates an embodiment of a lock to a resource.

FIG. 2 illustrates an embodiment of a lock 200, such as a word lock, included in a resource 112, and includes a thread identifier (ID) 202 identifying the thread 110 currently holding or reserving the lock for the resource 112; a recursion counter 204 indicating a number of times the lock has been acquired, or entered, without a corresponding release or exit, such as with nested acquisitions of the lock by the thread 202 when the lock has not been released for a previous acquisition of the lock; a reservation field (bit) 206 that is set to indicate the lock is reserved by the thread 202 to prevent another thread from accessing the lock; and additional bits 208, used for lock state management such as a flat lock contended (FLC) bit that is set by another thread after having repeatedly tried to acquire a flat lock and needing to generate to using a true operating system monitor.

Figure 3:
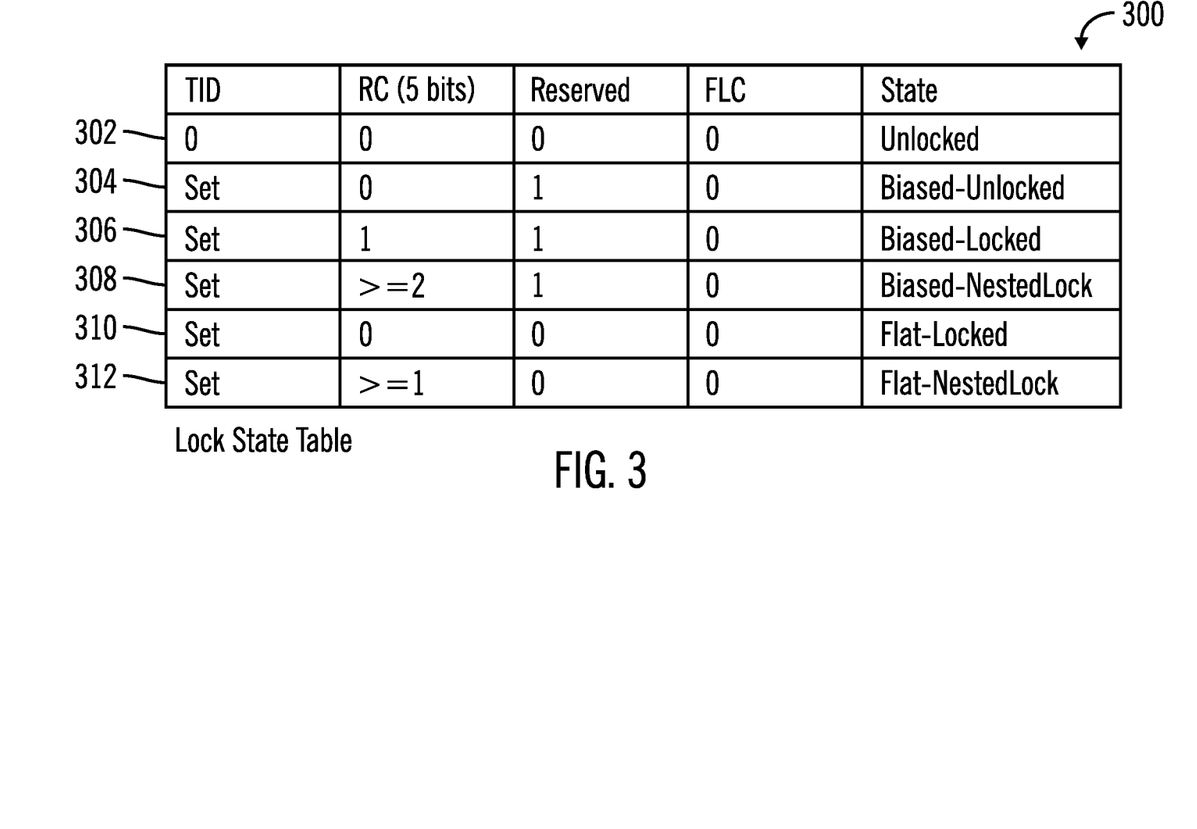
FIG. 3 illustrates an example of a lock state table.

FIG. 3 illustrates an example of one implementation of a lock state table 300 providing different lock states indicated by the values of the set fields. When a lock is in an unlocked state 302, all the fields 202, 204, 206, 208 have a zero or empty value. A biased unlocked state 304 is when the recursion counter 204 is zero and the reserved field 206 indicates reserved, which occurs if there has been a release, such as an exit or monexit, from acquiring a first level non-nested lock in a series of acquire/release operations. A biased locked state 306 is when the recursion counter 204 is one indicating the lock has been acquired and the reservation field 206 indicates reserved, set to 1. The biased nested lock state 308 is when the recursion counter 204 is greater than or equal to two indicating the lock has been acquired in at least one nested level, and the reserved field 206 indicates reserved. The lock state table 300 further indicates flat locked states 310, 312 which can be inflated when accessed so that an operating system monitor can be used if the lock is contended.

Figure 4:
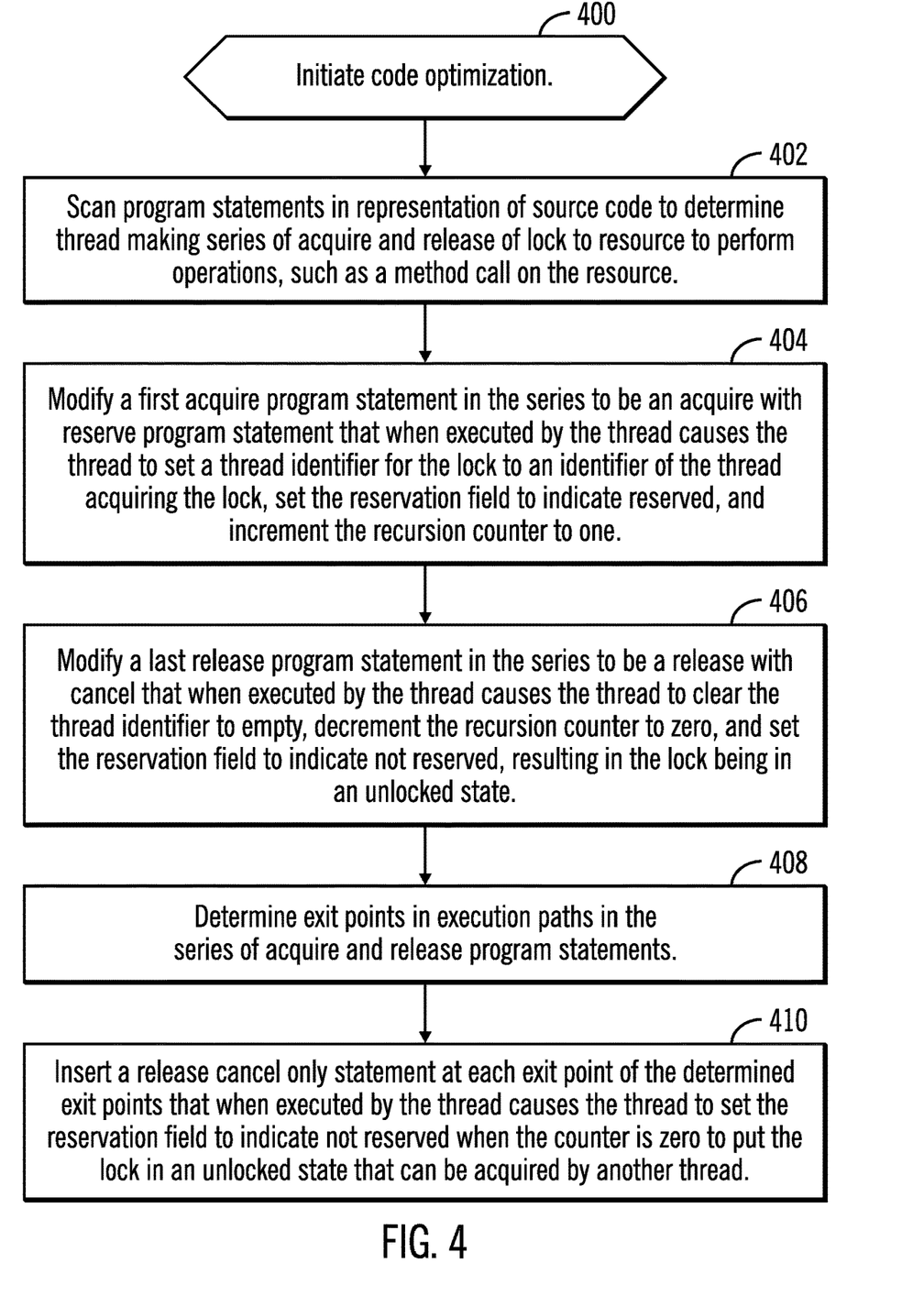
FIG. 4 illustrates an embodiment of operations to optimize the code including a series of acquire and release instances for a same lock.
Figure 5:
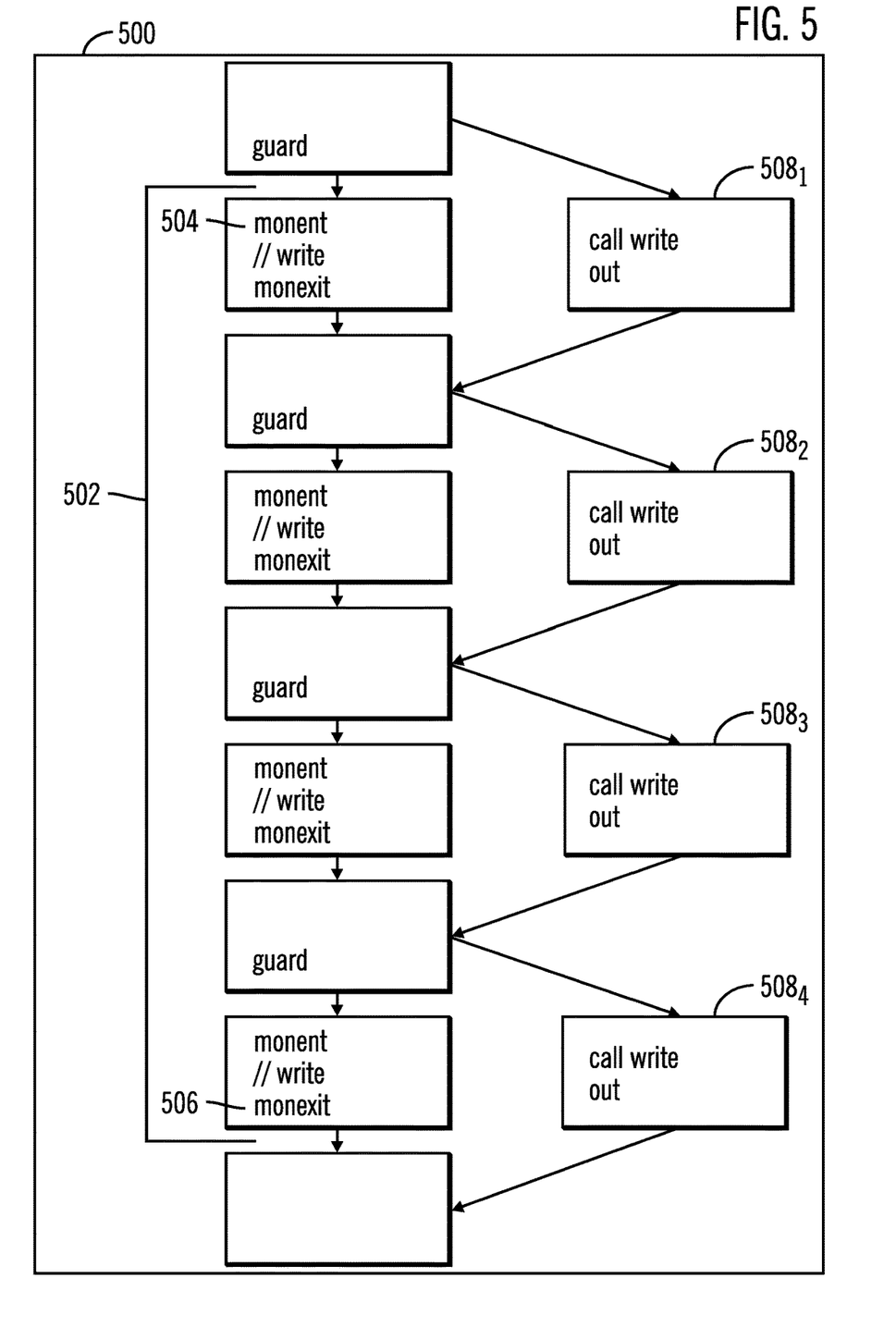
FIG. 5 illustrates an example of code for a series of acquire and release operations with respect to a same lock subject to inlining.
Figure 6:
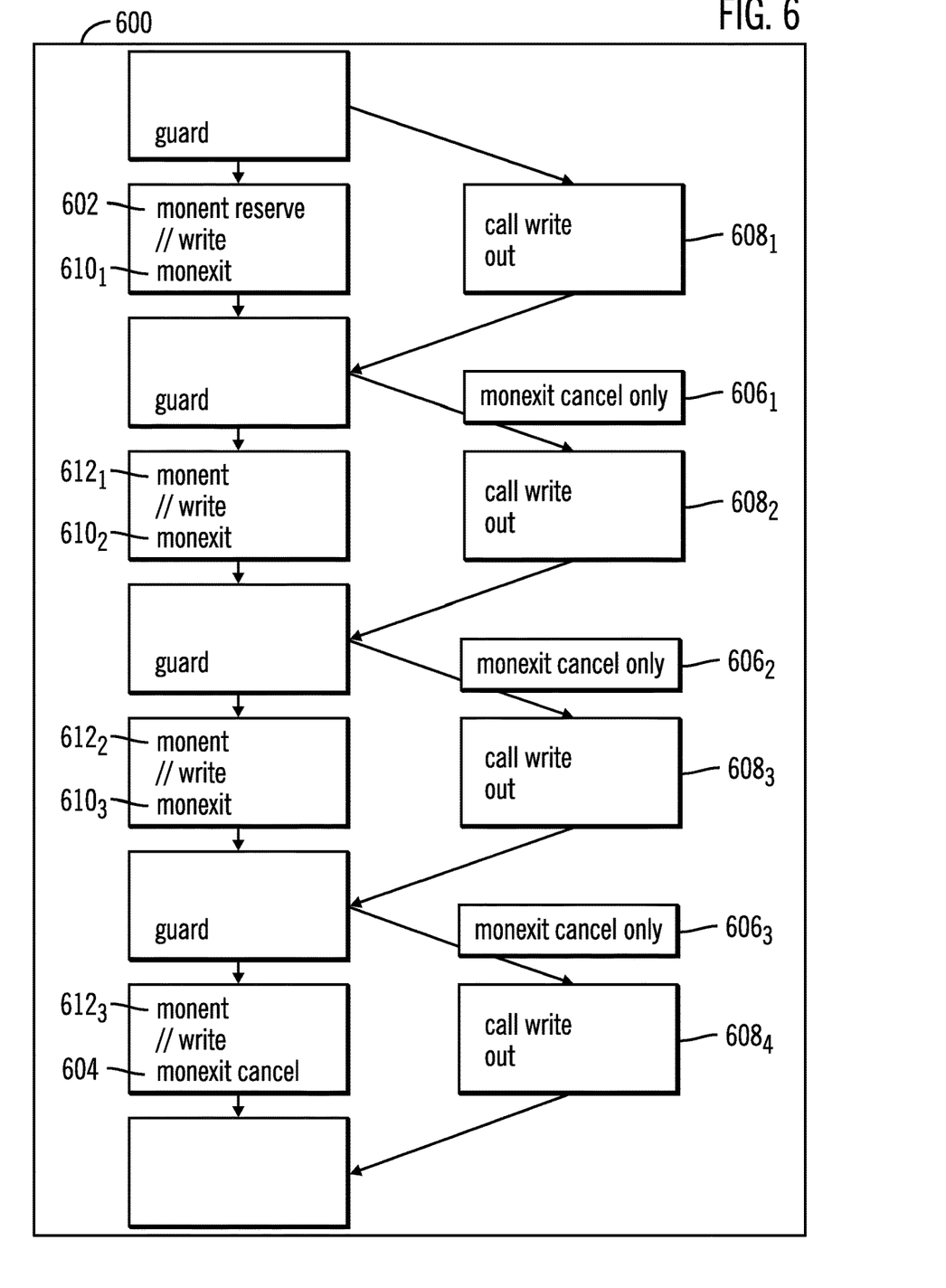
FIG. 6 illustrates an example of an optimization to the code of FIG. 6 subject to inlining.

FIG. 4 illustrates an embodiment of operations performed by the compiler 114 to optimize the source code 116, such as program statements 500 in FIG. 5, by replacing a series of lock acquire and releases with optimized code 118 consuming less computational resources, such as optimized program statements 600 in FIG. 6. Upon initiating (at block 400) the code 116 optimization, the compiler 114 scans (at block 402) program statements in a program representation of the source code 116 to determine a thread 110 making calls to a series of acquire and releases of a lock 200 to the same resource 112 to perform operations, such as a method call to the resource 112. FIG. 5 provides an example of program statements 500 having a series 502 of acquire lock operations, or "monents", and corresponding releases of the lock, or monexits, to release the lock. Each acquire (monent) and release (monexit) pair is for a write operation with respect to the resource 112 covered by the lock 200. Each monent involves obtaining a biased locked state to set the recursion counter 204. Each monexit involves decrementing the recursion counter 204. The compiler 114 modifies (at block 402) a first acquire (monent) program statement 504 (in FIG. 5) in the series to be an acquire with reserve program statement 602, or "monent reserve" as shown in FIG. 6. The acquire with reserve statement 602 when executed by the thread 110 causes the thread 110 to set a thread identifier 202 for the lock to an identifier of the thread acquiring the lock, set the reservation field 206 to indicate reserved, and increment the recursion counter 204 to one.

The compiler 114 modifies (at block 406) a last release (monexit) program statement 506 in the series 500 to be a release with cancel, or monexit cancel 604 shown in the optimized program statements 600. Executing the release with cancel 604 statement causes the thread 110 to clear the thread identifier 202 to empty, decrement the recursion counter 204, and set the reservation field 206 to indicate not reserved, which results in the lock being in the unlocked state 302.

The compiler 114 further determines (at block 408) exit points in execution paths in the series of acquire and release lock program statements 502, such as the exit points 5081, 5082, 5083, 5084 which comprises flows in the program statements 500 at which the thread 110 can release the lock to return to the unlocked state 302 where the lock is available for acquisition by other threads. The compiler 114 optimizes the code by inserting (at block 410) a release cancel only statement at each exit point 5081, 5082, 5083, 5084 of the determined exit points, such as shown in FIG. 6 as the monexit cancel only statements 6061, 6062, 6063, inserted at the exit points 6081, 6082, 6083. The thread 110 executes the release cancel only statements, e.g., monexit cancel only, to set the reservation field 206 to indicate not reserved. In this way, if the flow of execution is to exit the series of acquire and release statements when the recursion counter 204 is zero and the reservation bit 206 is set indicating reserved, at which point the lock 200 is released by setting the reservation bit 206 to indicate not reserved to make the lock available, i.e., in the unlocked state 302.

The result of the operations of FIG. 4 is optimized compiled code 118, as shown in FIG. 6, which may then be further compiled to produce executable object code 120. This optimization replaces the computationally expensive series of acquire and release instances with a single lock reservation over the entire series of acquire/release operations. With the reservation held, acquire and release operations become simple increment and decrement operations on the recursion counter 204 which do not employ expensive memory synchronization instructions.

The calls in the unoptimized program statements 500 of FIG. 5 are inlined and guards are placed around the inlined functions to verify they are the correct functions to run. If the guard fails, methods are called, e.g., write, as if no inlining happened. The optimization of FIG. 6 adds the reservation only acquire 602, the cancellation only release 604 at the bottom, as well as the cancellation only releases 6061, 6062, 6063 on the taken sides of the guards.

FIG. 6 illustrates the inlining that would result after the optimization of FIG. 5, where the first entry 602, "monent reserve", is now the initial lock reservation only. The monexits 6101, 6102, 6103 between the first monent reserve 602 (acquire with reserve) and last monexit cancel 604 (release with cancel) operate by decrementing the recursion counter 204 without resetting the reservation field 206 to indicate reserved. The monents 6121, 6122, 6123 between the first monent reserve 602 and last monexit cancel 604 operate by incrementing the recursion counter 204 without resetting the reservation field 206 to indicate reserved, because the reservation field would have been already set with the monent reserved 602 statement. Further, with the described optimization, a "monexit cancel only" is added for each guard statement to provide a cancellation of the lock reservation if the thread 110 processing the code of FIG. 6 is forced to exit the series of lock operations, so that the lock reservation is released on exit to avoid a true reservation cancellation which would incur a performance penalty.

The compiler 114 performs the optimization by scanning the program statements 600 of FIG. 6 to find sequences of repeated, non-recursive monent/monexit operations at the same nesting depth that are likely performed on the same resource 112. The heuristic for determining whether two locks may be operating on the same object may vary between implementations. In one implementation, scanning for a lock being taken may comprise looking for a lock being taken on an object loaded. In a further implementation, scanning for the lock may include looking for a lock being from the same non-volatile field with no obvious writes to the field over range of operations being considered for optimization.

In one embodiment, the compiler 114 first scans the sequence of operations to create sequences of monent and corresponding monexit pairs which are stored in a list ordered by monent location. Each pair records its nesting depth. To counter any operation to prohibit this optimization from applying (one example would be a call to an arbitrary function—because of its unknown duration it could make reservation cancellation much more likely) a marker object is pushed into the sequence of monent/monexit pairs to indicate that the optimization should not cross the specified point (in our implementation this is currently just a node with NULL monent and monexit references, but could be more sophisticated if required. The compiler 114 scans the sequence of monent and monexit pairs to find sequences of sequential monent/monexit operations at the same nesting depth which appear to be on the same object using our heuristics.

If a sequence is identified, the compiler 114 transforms the sequence to reserve the locked object to the current thread at the start of the sequence and to release the reservation at the end of the sequence or on any departures from the extended block. Releasing the reservation is a local cancellation and is significantly computationally less expensive than a true reservation cancellation since there is no thread blocked waiting for the locking thread to release the lock and no synchronization needed between threads. The transformation applied by the compiler 114 is to mark the first monent 704 as a reserving lock (rather than the default lock), to mark the last monexit 712 as a cancelling unlock (rather than the default unlock), and to split all the mid-extended block departures and add monexits on these paths that are marked cancel.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
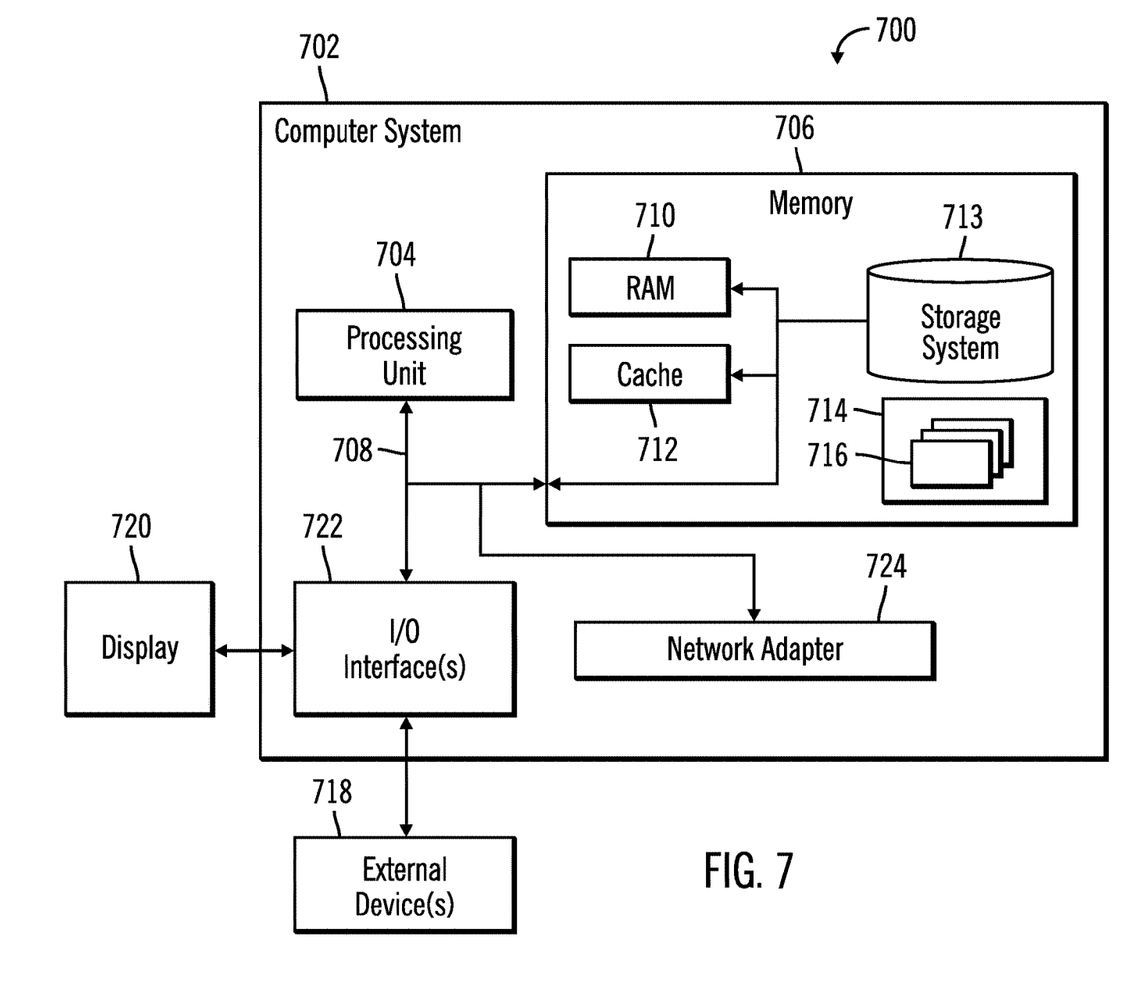
FIG. 7 illustrates a computing environment in which the components of FIG. 1 may be implemented.

The computing system 100 of FIG. 1 may further include components as described with respect to a computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing a lock to a resource, the computer program product comprising a computer readable storage medium having computer readable program code embodied therein that is executable to perform operations, the operations comprising:
   scanning a representation of source code to determine a series of pairs of acquire and release lock program statements to acquire and release a lock by a thread;
   modifying a first acquire lock program statement in the series of pairs of acquire and release lock program statements to be an acquire with reserve program statement that when executed by the thread causes the thread to acquire the lock and indicate the lock as reserved for use by the thread;
   modifying a last release lock program statement in the series of pairs of acquire and release lock program statements to be a release with cancel only program statement that when executed by the thread causes the thread to release the lock and indicate the lock as not reserved;
   determining at least one exit point in execution paths between the pairs of acquire and release lock program statements at which the lock can be released to be available for other threads; and
   inserting a cancel statement at the at least one exit point, wherein execution of the cancel statement by the thread indicates the lock as not reserved upon exit from the series of pairs of acquire and release lock program statements at the at least one exit point, wherein execution of an exit point of the at least one exit point and the cancel statement at the executed exit point results in bypassing a pair of acquire and release program statements in the series of pairs of acquire and release lock program statements and returning, after execution of the exit point and cancel statement, to a following pair of acquire and release program statements in the series of pairs of acquire and release program statements following the bypassed pair of acquire and release program statements.

2. The computer program product of claim 1, wherein the acquire with reserve program statement further causes the thread to set a thread identifier for the lock to an identifier of the thread and set a counter to one, and wherein the release with cancel program statement causes the thread to clear the thread identifier to empty and decrement the counter to zero resulting in the lock being in an unlocked state.

3. The computer program product of claim 2, wherein the acquire with reserve program statement causes the thread to indicate the lock as reserved before incrementing the counter, and wherein the release with cancel program statement causes the thread to decrement the counter before indicating the lock as not reserved.

4. The computer program product of claim 1, wherein the acquire with reserve program statement further causes the thread to set a counter to one, and wherein the release with cancel only program statement causes the thread to decrement the counter to zero.

5. The computer program product of claim 4, wherein the release with cancel only program statement further causes the thread to indicate not reserved when a counter is zero to put the lock in an unlocked state that can be acquired by another thread, wherein the counter is incremented when the acquire with reserve program statement is executed.

6. The computer program product of claim 4, wherein the thread processes the release with cancel only statement to return to processing remaining acquire and release lock program statements in the series not yet processed when the counter is greater than zero.

7. The computer program product of claim 4, wherein the thread processes acquire lock program statements between the first acquire lock program statement and the last release lock program statement to increment the counter and wherein the thread processes release lock program statements between the first acquire lock program statement and the last release lock program statement to decrement the counter.

8. The computer program product of claim 4, wherein the thread increments the counter to an integer greater than one in response to subsequently acquiring the lock before a previously acquired lock is released, wherein the lock is in a nested lock state when the counter is greater than or equal to two, and wherein the release with cancel only program statement when executed does not indicate not reserved when a lock state is in the nested lock state with the counter greater than or equal to two.

9. The computer program product of claim 1, wherein the acquire with reserve program statement further sets a counter to one, wherein the release with cancel program statement further decrements the counter, wherein release lock program statements, between the first acquire lock program statement and the last release lock program statement, decrement the counter to zero and leaves the lock as reserved in a biased unlocked state, and wherein acquire lock program statements, between the first acquire lock program statement and the last release lock program statement, increment the counter and leaves the lock as reserved in a biased locked state and the counter greater than or equal to one.

10. A system for managing a lock to a resource, comprising:
    a processor; and
    a computer readable storage medium having computer readable program code embodied therein that when executed by the processor performs operations, the operations comprising
        scanning a representation of source code to determine a series of pairs of acquire and release lock program statements to acquire and release a lock by a thread;
        modifying a first acquire lock program statement in the series of pairs of acquire and release lock program statements to be an acquire with reserve program statement that when executed by the thread causes the thread to acquire the lock and indicate the lock as reserved for use by the thread;
        modifying a last release lock program statement in the series of pairs of acquire and release lock program statements to be a release with cancel only program statement that when executed by the thread causes the thread to release the lock and indicate the lock as not reserved;
        determining at least one exit point in execution paths between the pairs of acquire and release lock program statements at which the lock can be released to be available for other threads; and
        inserting a cancel statement at the at least one exit point, wherein execution of the cancel statement by the thread indicates the lock as not reserved upon exit from the series of pairs of acquire and release lock program statements at the at least one exit point wherein execution of an exit point of the at least one exit point and the cancel statement at the executed exit point results in bypassing a pair of acquire and release program statements in the series of pairs of acquire and release lock program statements and returning, after execution of the exit point and cancel statement, to a following pair of acquire and release program statements in the series of pairs of acquire and release program statements following the bypassed pair of acquire and release program statements.

11. The system of claim 10, wherein the acquire with reserve program statement further causes the thread to set a thread identifier for the lock to an identifier of the thread and set a counter to one, and wherein the release with cancel program statement causes the thread to clear the thread identifier to empty and decrement the counter to zero resulting in the lock being in an unlocked state.

12. The system of claim 10, wherein the acquire with reserve program statement further causes the thread to set a counter to one, and wherein the release with cancel program statement causes the thread to decrement the counter to zero.

13. The system of claim 12, wherein the release with cancel program statement further causes the thread to indicate not reserved when a counter is zero to put the lock in an unlocked state that can be acquired by another thread, wherein the counter is incremented when the acquire with reserve program statement is executed.

14. A method for managing a lock to a resource in a computing system, comprising:
    scanning a representation of source code to determine a series of pairs of acquire and release lock program statements to acquire and release a lock by a thread;
    modifying a first acquire lock program statement in the series of pairs of acquire and release lock program statements to be an acquire with reserve program statement that when executed by the thread causes the thread to acquire the lock and indicate the lock as reserved for use by the thread;
    modifying a last release lock program statement in the series of pairs of acquire and release lock program statements to be a release with cancel only program statement that when executed by the thread causes the thread to release the lock and indicate the lock as not reserved;
    determining at least one exit point in execution paths between the pairs of acquire and release lock program statements at which the lock can be released to be available for other threads; and
    inserting a cancel statement at the at least one exit point, wherein execution of the cancel statement by the thread indicates the lock as not reserved upon exit from the series of pairs of acquire and release lock program statements at the at least one exit point, wherein execution of an exit point of the at least one exit point and the cancel statement at the executed exit point results in bypassing a pair of acquire and release program statements in the series of pairs of acquire and release lock program statements and returning, after execution of the exit point and cancel statement, to a following pair of acquire and release program statements in the series of pairs of acquire and release program statements following the bypassed pair of acquire and release program statements.

15. The method of claim 14, wherein the acquire with reserve program statement further causes the thread to set a thread identifier for the lock to an identifier of the thread and set a counter to one, and wherein the release with cancel program statement causes the thread to clear the thread identifier to empty and decrement the counter to zero resulting in the lock being in an unlocked state.

16. The method of claim 14, wherein the acquire with reserve program statement further causes the thread to set a counter to one, and wherein the release with cancel program statement causes the thread to decrement the counter to zero.

17. The method of claim 16, wherein the release with cancel program statement further causes the thread to indicate not reserved when a counter is zero to put the lock in an unlocked state that can be acquired by another thread, wherein the counter is incremented when the acquire with reserve program statement is executed.

* * * * *